US005920141A

United States Patent [19]

Edgerton

[11] Patent Number: 5,920,141

[45] Date of Patent: Jul. 6, 1999

[54] PLUG IN COMMUTATOR, A PLUG IN SEGMENT FOR MAKING A PLUG IN COMMUTATOR AND A HUB BODY FOR MAKING A PLUG IN COMMUTATOR

[75] Inventor: Douglas Arthur Edgerton, Wallington, United Kingdom

[73] Assignee: Watliff Company Limited, United Kingdom

[21] Appl. No.: 08/986,279

[22] Filed: Dec. 6, 1997

[30] Foreign Application Priority Data

Sep. 29, 1997 [GB] United Kingdom .................. 9720636

[51] Int. Cl.[6] .......................... H02K 13/00; H02R 39/04

[52] U.S. Cl. .......................................... 310/236; 310/235

[58] Field of Search .................................. 310/235, 236, 310/231, 233, 237

[56] References Cited

U.S. PATENT DOCUMENTS 3,496,398 2/1970 Calver .................................... 310/236

FOREIGN PATENT DOCUMENTS 603493 6/1948 United Kingdom .
795825 5/1958 United Kingdom .
615070 12/1998 United Kingdom .
WO95/14319 5/1995 WIPO ........................... H01R 43/06
WO97/07573 2/1997 WIPO ........................... H01R 43/06

OTHER PUBLICATIONS

Hassebe, "Manufacture of Commutator for Rotary Electric Machine," Japanese Abstract 63–249446, Oct. 1988.

Ogiso, "Commutator", Japanese Abstract 2–285949, Nov. 1990.

Tanaka et al., "Commutator and Rotary Converter with It", Japanese Abstract 7–163091, Jun. 1995.

*Primary Examiner*—Nestor Ramirez
*Assistant Examiner*—Burt S. Mullins

[57] ABSTRACT

A plug in commutator has a hub body (1) of nominally cylindrical cross section. Ribs (4) are formed on the circumferential periphery of the hub body (1) each rib extends longitudinally and is equiangularly spaced to define grooves (5). The ribs are of cylindrical section and so form substantially hour glass sectioned grooves (4). Each groove (4) accommodates a portion of a conductive segment (2) which has opposing radially extending surfaces oversized and shaped corresponding to the shape of the adjacent groove surfaces. At least a part (11) of the oversized portion is of swallow tailed shape to be resiliently deformable and is sized to leave a small gap 5' between the bottom of the groove and the bottom of the segment (2). The commutator is assembled by slotting a preformed segment (2) one into each groove (5). The resiliently deformable part acts to prevent displacement of the segment (2) and to relieve stresses imposed on the hub body (1).

14 Claims, 2 Drawing Sheets

PLUG IN COMMUTATOR, A PLUG IN SEGMENT FOR MAKING A PLUG IN COMMUTATOR AND A HUB BODY FOR MAKING A PLUG IN COMMUTATOR

The present invention is concerned with a commutator and a method of constructing a commutator in which each conductive segment of the commutator is preformed and plugged into a groove in a preformed commutator body.

A commutator of the plug in type is known from WO 97/07573. In this prior art the commutator segments are plugged by axial displacement into grooves defined by ribs formed at the periphery of the hub body of the commutator. To prevent radial displacement each segment and groove has a cross sectional profile in which a circumferential dimension of the segment and the complementary profile of the groove at the peripheral surface is less than at a radially inner portion. To retain the segment in the axial direction, each segment and/or its corresponding groove is formed with three longitudinally extending parts. First and third longitudinally extending parts are located one each at opposite ends of the segment. The second longitudinally extending part is located between the first and third parts and has a cross sectional profile which closely or loosely complements the profile of the groove. The first and third parts are oversized. The oversize parts only engage to form an interference fit and so to lock the segment into the groove when the segment is almost fully inserted into the groove and are such as to urge the ends of the segment to be displaced in the radial direction. To ensure a tight fit when fully inserted, the profile of each segment and groove must include inclined portions which act as wedges so that the segment is wedged in place to retain it firmly in the circumferential direction.

The aforementioned prior art is subject to a number of technical problems as follows. Each segment requires a production step to form the oversize portions which adds to the production costs.

The aforementioned prior art requires consistently high precision in the manufacture of the segments and moulded hub in order to avoid cracking due to tensile forces causing failure at the narrowest portion of the ribs.

The complicated profile of the prior art segment and groove adds to the difficulties of production.

The complicated profile of the prior art segment and groove results in a non-uniform distribution of stresses on the ribs both in the longitudinal direction and around the profile. These stresses are concentrated at the narrowest portions of the ribs. Each rib and hub body is necessarily made of somewhat brittle material having a small coefficient of thermal expansion to provide for dimensional stability during use and the segments are ordinarily made of a conductor such as aluminium or copper with a high coefficient of thermal expansion. Consequently the material of the hub body is liable to crack either during insertion of the segments or subsequently as a consequence of repeated cycles of use leading to failure of the commutator.

The mechanical stability of each segment varies in relation to the variation in the manufacturing precision of the components. Such variation may permit “bar lift” where a segment is higher or lower than the adjacent segments. The commutator rotates at high speed, engaging the current carrying carbon brushes of the electric motor. Bar lift causes excessive brush wear and eventually failure.

A further problem with the prior art commutator is “creep” caused by the combination of the stresses imposed on the hub during assembly and the variation of temperature during operation. This results in progressive loosening of the segments and possible cracking of the ribs. Creep leads to bar lift and premature failure of the commutator.

It is an object of the present invention to provide a construction of commutator and a method of construction which alleviates the aforementioned disadvantages of the prior art.

Accordingly there is provided a plug in commutator comprising:

- a hub body having a nominally cylindrical peripheral surface made of electrically insulating material and having a rotary axis,
- a plurality of ribs defining grooves extending parallel to the rotary axis formed in the peripheral surface of the hub,
- a plurality of elongate segments formed of conductive material inserted and secured one each into each groove so that a peripheral surface of each segment is exposed, each groove and segment having a cross section profiled to prevent displacement in the radial direction and each said segment having at least a portion with an oversize cross section profile to prevent displacement in the longitudinal direction wherein at least a part of the oversize portion of the segment is resiliently deformable to relieve the stresses imposed on the hub body during insertion of the segment and subsequent operation of the commutator.

By virtue of the present invention the resiliently deformable part of each segment is shaped so that it will deform to accommodate dimensional changes at the oversize part and so alleviate stresses and creep. The alleviation of stresses reduces the effect of normal manufacturing process variations in dimensions so improving reliability and performance.

The provision of a resiliently deformable part on each segment allows the cross section profile of the segment to be uniform along its entire length. This in turn allows production of long lengths of the segment in a continuous process such as extrusion and cutting to a desired segment length before or after insertion in each groove.

By careful design of the resiliently deforming part of the segment the forces which resiliently deform the part of the segment act to urge the segment both radially inwards and to locate each segment securely and centrally in each groove. This means the invention provides for mechanical contiguity between the segments. In a preferred design the resiliently deformable part is a bifurcated and preferably swallow tail shaped, section wherein the resilient deformation occurs in each of the peripheral and radial directions. Preferably the swallow tail shaped section is disposed symmetrically about a radius and spaced radially in from the peripheral surface and the segment has an enlarged radially outer portion forming the exposed head part.

Preferably the surfaces of the segment extending from a head part of each segment adjacent the peripheral surface of the hub body, to the swallow tail portion are complementary and arcuate and the ribs are of substantially cylindrical section so that the stresses imposed on each rib by each segment are uniformly distributed.

Any dynamic or thermally generated forces exerted upon any segment is distributed to the adjacent segments, preventing bar preventing bar lift. The commutator is thus suitable for high speed applications.

According to a second aspect of the present invention there is provided a segment for a plug in commutator having a cross sectional profile shaped to provide a portion which is able to deform resiliently when the segment is received into a groove in a hub body, said segment being dimensioned so that the resiliently deformable portion forms an interference fit when it is inserted in a groove.

According to a third aspect of the present invention there is provided a hub body for making a commutator comprising ribs formed on its periphery to extend parallel to the axis and define grooves to receive segments in the process of making a commutator, wherein each rib has a substantially a cylindrical cross section.

A commutator constructed in accordance with present invention will now be described, by way of example only, with reference to the accompanying figures, in which.

Figure 1:
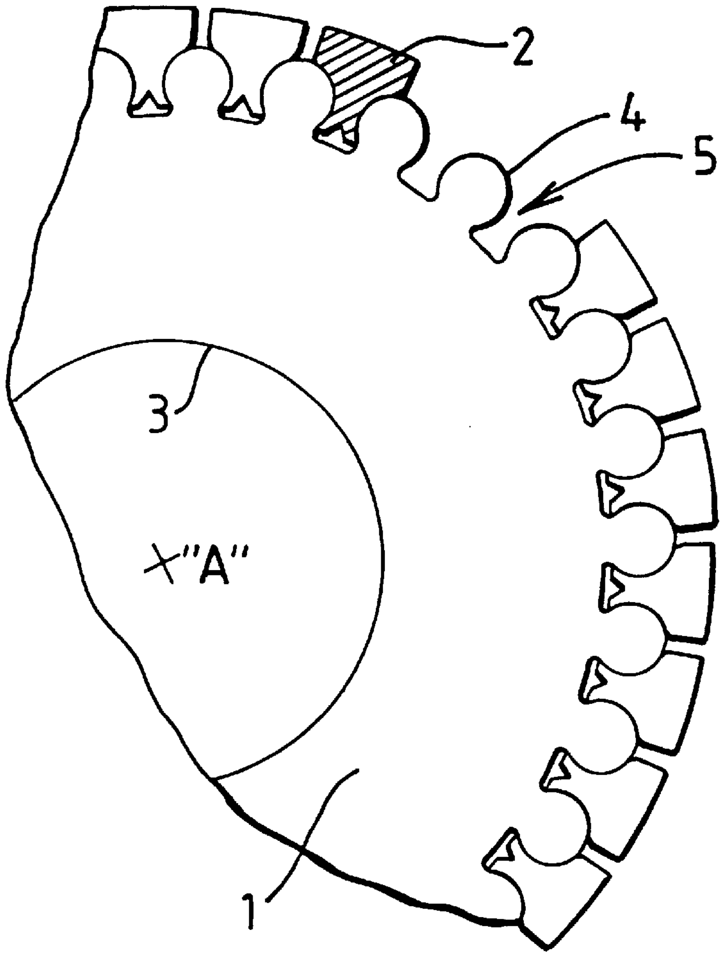
FIG. 1 is a view on a rotary axis "A" of the commutator.

Referring to the figures a commutator comprises a hub body 1 and a plurality of segments 2. The hub body 1 is formed from an electrically insulating material and has a bore 3 extending axially therethrough, by means of which it can be mounted for rotation when used in the construction of an armature in a rotary electric machine. A plurality of spaced ribs 4 are formed around the circumferential periphery of the hub body 1. In the case of the example the ribs 4 are equally spaced and extend all the way around the periphery, although for purposes of clarity this is illustrated for only part of the circumference. Each rib has a cylindrical cross section except where it merges with the rest of the hub body so that a groove 5 of roughly hour glass shaped profile is formed between each adjacent rib 4. Each groove 5 has a smooth and continuously curving wall surface in the circumferential direction. The cross sectional profile of each groove 5 is uniform along its entire length and has a radially outermost part wide in the circumferential direction which initially narrows towards the axis "A" and then broadens.

Each segment 2 is formed from any suitable conductive material, examples of which include copper or aluminium, and is divided longitudinally into a first part 6 and a second part 7. The first part 6 is adapted to engage with one of the grooves 5 while the second part 7 is a tongue projecting from the first part 6 away from the groove 5.

Figure 2:
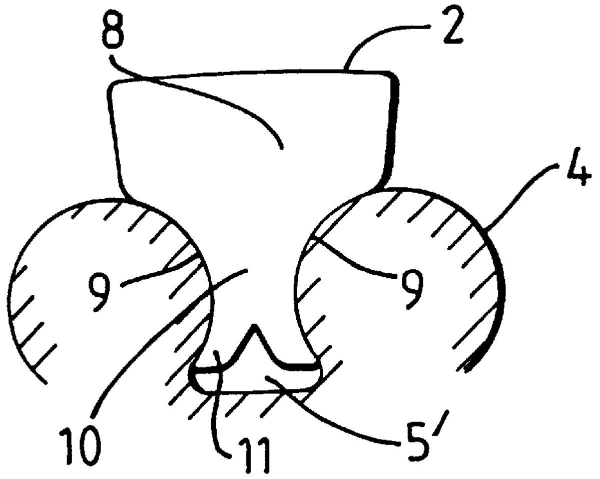
FIG. 2 is an enlarged detail viewed from parallel to the axis "A" showing a segment engaged in two ribs of the hub body.

The first part 6 of the segment 2 is formed with a special cross section profile which can best be seen in FIG. 2. The cross section profile consists of a head part 8. Opposite circumferential surfaces 9 are arcuate, concave and correspond in shape to the surface of the rib 4 against which it will bear after installation in the groove 5. The circumferential surfaces define a necked portion 10 which joins the head 8 to a bifurcated resiliently deformable part 11. The resiliently deformable part 11 is of swallow tailed shape. The resiliently deformable part and the groove are dimensioned to leave a small gap 5' at the bottom of the groove 5 so that it is able to deform both in the radial direction and in the circumferential direction to accommodate stresses imposed during installation of the segment 2 in the groove 5 and during use in an armature.

Figure 3:
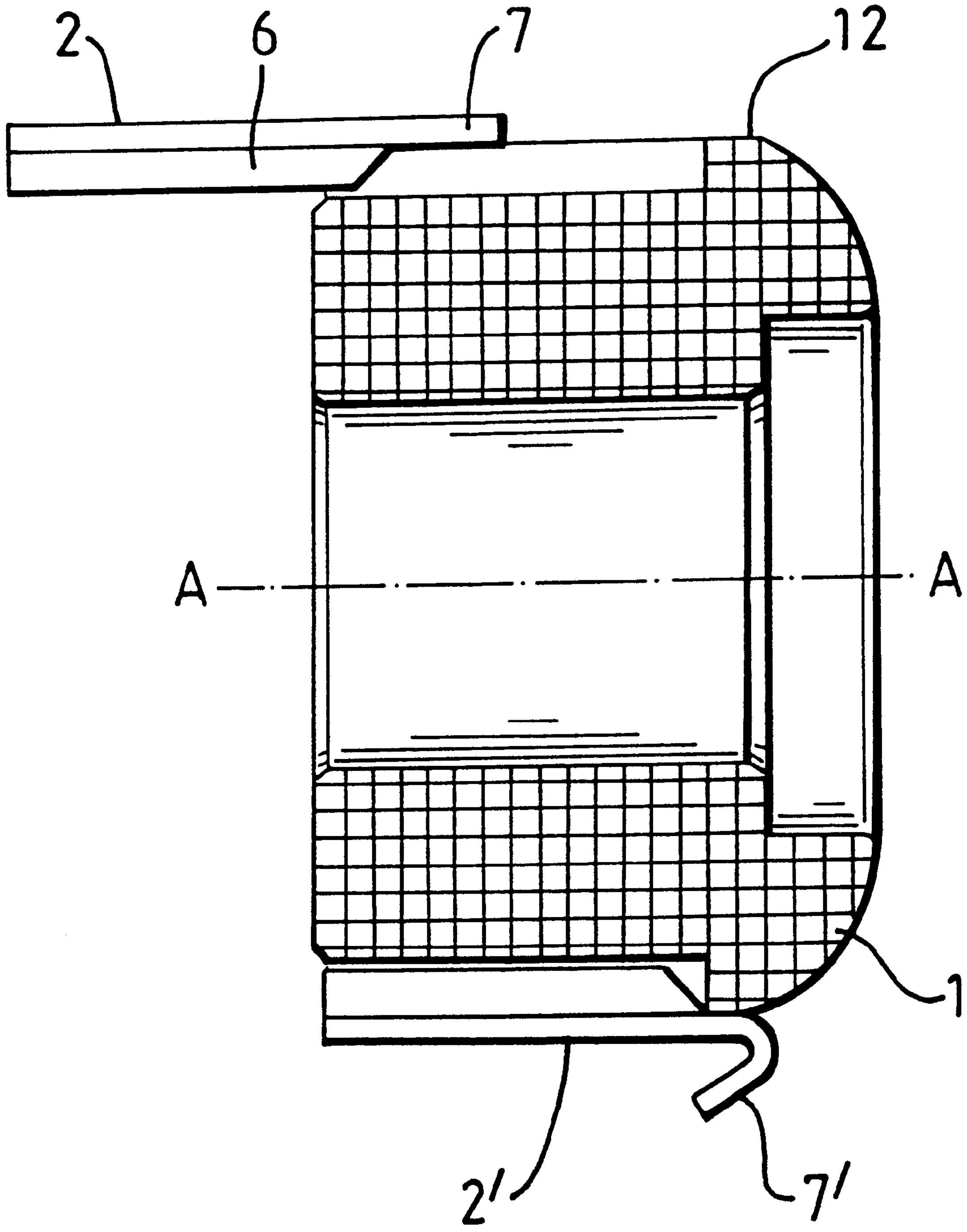
FIG. 3 is a sectional elevation perpendicular to the axis "A" showing the location of segments in the grooves of the hub body.

FIG. 3 shows various stages in the installation of a segment 2 in a hub body 1. Segment 2 has been located in a groove 5 and is being displaced to the right in the figure. Eventually the segment is displaced until it engages a flange 12 formed on the hub body 1 as illustrated by segment 2'. The tongue part 7 is then upset to form a hook 7'. This process is continued until each groove 5 accommodates a segment 2. It will be appreciated that several segments may be introduced simultaneously.

If a hook 7' is required it may be preferable to form the hook 7 onto the segment before installation in the groove 5. However, it will be understood that the commutator segments may use means other than hooks 7' for attachment of the wires and the invention is not to be limited to hooks present on the segment.

The profile of the segment provides a number of improvements over the prior art. First, the resiliently deformable part 11 accommodates stresses imposed on the ribs 4 both during assembly and subsequently during use. These stresses may be caused by imprecision in the shaping of the profile of the ribs 4 and or the segments 2 which may be compounded because of the large number of ribs and segments involved. The ribs 4 are thus less likely to crack and cause the commutator to fail than would be the case with the known plug in commutator.

Because the resiliently deformable part 11 will accommodate imprecision in the segment or groove, larger tolerances may be permitted during manufacture so that production costs can be reduced.

Both the grooves 4 and the segments 2 are profiled from simple curves with few discontinuities. This makes production simple so that relatively accurate manufacture is achievable and reduces the number of points at which stress concentrations occur.

The arcuate surfaces of the ribs 4 and segments 2 provide a large gripping surface to prevent displacement of the segments in the longitudinal direction.

Because the segments and ribs are of uniform cross section profile manufacture is simplified. In the prior art it is essential to provide a part which is oversized adjacent one end and another longitudinally extending part which is a loose fit in the groove.

I claim:

1. A plug in commutator having a hub body having a nominally cylindrical peripheral surface made of electrically insulating material and having a rotary axis, a plurality of ribs defining grooves extending parallel to the rotary axis formed in the peripheral surface of the hub, a plurality of elongate segments formed of conductive material inserted, during an assembly of the commutator, and secured one each into each groove so that a peripheral surface on a head of each segment is exposed, each groove and segment having a cross section profiled to prevent displacement in the radial direction and each said segment, prior to assembly, having at least a portion with an oversize cross section profile resiliently deformed within its groove to prevent displacement in the longitudinal direction and to relieve stresses imposed on the hub body during insertion of the segment and subsequent operation of the commutator.

2. A plug in commutator according to claim 1 wherein the resilient deformation is in each of the peripheral and radial directions.

3. A plug in commutator according to claim 2 wherein the resiliently deformed portion has a swallow tail shape.

4. A plug in commutator according to claim 3 wherein the swallow tail shaped portion is disposed symmetrically about a radius and spaced radially in from the head and the segment has an enlarged radially outer portion forming the exposed part.

5. A plug in commutator according to claim 4 wherein the surfaces of the segment extending from the head to the swallow tail portion are arcuate and the ribs are of substantially circular cylindrical section.

6. A plug in commutator according to claim 1 wherein each said resiliently deformed portion forms an interference fit in its respective groove.

7. A plug in commutator according to claim 6 wherein the resiliently deformed portion has a bifurcated cross section profile symmetric about a radius.

8. A plug in commutator according to claim 7 wherein the bifurcated portion is located radially innermost and has a cross section shaped like a swallow tail.

9. A plug in commutator according to claim 8 wherein circumferentially facing surfaces of the segment engage ribs of the hub body and are smooth and arcuate to disperse stresses imposed on the rib.

10. A plug in commutator according to claim 6 wherein each said segment deformed portion comprises two radially extending prongs each resiliently pressing against a respective side wall of the groove in which the segment is disposed, said two prongs being separated by a second open space merging with said first open space.

11. A plug in commutator according to claim 10 wherein the peripheral direction width of said first open space increases with increasing distance from the segment towards the groove bottom wall.

12. A plug in commutator according to claim 1 wherein each groove includes a radially innermost bottom wall, and each segment resiliently deformed portion is spaced from the bottom wall of the groove in which it is disposed by a first open space of sufficient size for stress free expansion of said deformed portion into said open space during operation of the commutator.

13. A plug in commutator having a hub body having a nominally cylindrical peripheral surface made of electrically insulating material and having a rotary axis, a plurality of ribs defining grooves extending parallel to the rotary axis on the peripheral surface of the hub, each groove having radially extending side walls and a radially innermost bottom wall, a plurality of elongate segments formed of a conductive material disposed one each in each groove so that a peripheral surface on a head of each segment is exposed, each groove and segment having a cross section profiled to prevent displacement of the segment within its groove in the radial direction, and each said segment including a radially innermost end portion including an axially extending slot bifurcating the end portion into two spaced apart radially extending protrusions resiliently deformed and in spring biased interference contact with respective groove walls for preventing axial movement of the segment within its groove.

14. A plug in commutator according to claim 13 wherein each said segment end portion is radially spaced from the groove bottom wall by an open space of increasing area in a direction from the segment end portion towards the groove bottom wall.

* * * * *